(12) United States Patent
Kaul et al.

(10) Patent No.: US 10,885,571 B2
(45) Date of Patent: Jan. 5, 2021

(54) INFORMATION SET PURCHASE RECOMMENDATIONS

(71) Applicant: International Business Machines Corporation, Armonk, NY (US)

(72) Inventors: Akshar Kaul, Bangalore (IN); Manish Kesarwani, Bangalore (IN); Gagandeep Singh, Jalandhar (IN); Sameep Mehta, New Delhi (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 272 days.

(21) Appl. No.: 15/981,333

(22) Filed: May 16, 2018

(65) Prior Publication Data
US 2019/0355044 A1    Nov. 21, 2019

(51) Int. Cl.
| *G06Q 30/00* | (2012.01) |
| *G06Q 30/06* | (2012.01) |
| *G06F 16/21* | (2019.01) |

(52) U.S. Cl.
CPC ........ *G06Q 30/0631* (2013.01); *G06F 16/211* (2019.01)

(58) Field of Classification Search
None
See application file for complete search history.

(56) References Cited

U.S. PATENT DOCUMENTS

| 6,850,900 | B1 |   | 2/2005 | Hare et al. |
| 7,249,139 | B2 |   | 7/2007 | Chuah et al. |
| 8,725,584 | B1 | * | 5/2014 | Eager ............... G06Q 30/00 705/26.1 |
| 9,646,308 | B1 | * | 5/2017 | Eager ............... G06Q 30/00 |
| 9,741,066 | B2 | * | 8/2017 | Eager ............... G06Q 30/00 |
| 2008/0065552 | A1 |   | 3/2008 | Elazar et al. |

(Continued)

OTHER PUBLICATIONS

Yiling Chen et al. "Selling Information Through Consulting [arXiv]" arXiv : 24 . arXiv. (Jul. 9, 2019) (Abstract only) (Year: 2019).*

(Continued)

*Primary Examiner* — Naeem U Haq
(74) *Attorney, Agent, or Firm* — Ference & Associates, LLC (57) ABSTRACT

One embodiment provides a method, including: receiving, at a data service provider, a request from an information purchaser, wherein the request comprises (i) a budget identifying an amount of money to be spent on information and (ii) an objective function identifying a type of information that the information purchaser is requesting; accessing at least a subset of at least one information set of at least one information seller, wherein each of the at least one information sets comprises an information set available for purchase from the information seller; identifying whether at least one accessed information set that fulfills the received request; and providing, if at least one accessed information set fulfills the received request, a recommendation of an information set for purchase by the information purchaser, wherein the provided recommendation comprises at least one of the identified information sets that fulfills the received request.

20 Claims, 3 Drawing Sheets

(56) References Cited

U.S. PATENT DOCUMENTS

2014/0207494 A1* 7/2014 Rowell ................ G06Q 40/08
705/4
2015/0120920 A1    4/2015  Ferris et al.
2015/0229580 A1    8/2015  Ferris
2015/0332351 A1   11/2015  McBride et al.

OTHER PUBLICATIONS

Gilad-Bachrach, Ran et al., "Secure Data Exchange: A Marketplace in the Cloud", Cryptology e-Print Archive: Report 2016/620, Feb. 28, 2017, 30 pages, available at: https://eprint.iacr.org/2016/620.

* cited by examiner

INFORMATION SET PURCHASE RECOMMENDATIONS

BACKGROUND

Online marketplaces allow users to access a website or other network-connected location to purchase information or datasets. For example, an online marketplace may provide a website that users can access to purchase information or datasets that will thereafter be available for the purchaser to download or use in some predefined manner. As another example, an online marketplace may provide a network-connected location that users of the network can access to purchase or request information or dataset(s). Some online marketplaces may provide a network-accessible location where both buyers and sellers can virtually meet and perform transactions for goods and services including information or datasets. For example, rather than a shopper interacting with individual sellers of information or datasets, the shopper can instead access an online information marketplace and purchase the dataset or information from any of the multiple sellers that are associated with the online marketplace. In other words, some online marketplaces are not directed to a single seller of datasets or information, but, rather provide a type of community of multiple sellers and multiple buyers. Thus, online information marketplaces are becoming popular for buyers and sellers of information or datasets to assemble.

Some online marketplaces are operated by a cloud service provider. The cloud service provider is the entity that provides, operates, and otherwise maintains the online marketplace. The cloud service provider may act as the mediator or mechanism that is used to facilitate transfer of the bought datasets or information from the seller to the buyer. For example, a cloud service provider may facilitate and ensure the transfer of the datasets or information from the seller to the buyer and the transfer of funds from the buyer to the seller when datasets or information are purchased. In some cases, the cloud service provider may actually store the datasets or information that are for sale. For example, in a cloud information marketplace the cloud service provider may act as the repository for the information that can be purchased. In other words, the seller may transfer the information to the cloud service provider. Once a purchaser purchases the information, the cloud service provider may transfer at least a copy of the stored information to the buyer.

BRIEF SUMMARY

In summary, one aspect of the invention provides a method, comprising: receiving, at a data service provider, a request from an information purchaser, wherein the request comprises (i) a budget identifying an amount of money to be spent on information and (ii) an objective function identifying a type of information that the information purchaser is requesting; accessing at least a subset of at least one information set of at least one information seller, wherein each of the at least one information sets comprises an information set available for purchase from the information seller; identifying whether at least one accessed information set fulfills the received request, wherein the identifying comprises comparing the received request to the accessed at least a subset of the at least one information set; and providing, if at least one accessed information set fulfills the received request, a recommendation of an information set for purchase by the information purchaser, wherein the provided recommendation comprises at least one of the identified information sets that fulfills the received request.

Another aspect of the invention provides an apparatus, comprising: at least one processor; and a computer readable storage medium having computer readable program code embodied therewith and executable by the at least one processor, the computer readable program code comprising: computer readable program code configured to receive, at a data service provider, a request from an information purchaser, wherein the request comprises (i) a budget identifying an amount of money to be spent on information and (ii) an objective function identifying a type of information that the information purchaser is requesting; computer readable program code configured to access at least a subset of at least one information set of at least one information seller, wherein each of the at least one information sets comprises an information set available for purchase from the information seller; computer readable program code configured to identify whether at least one accessed information set fulfills the received request, wherein the identifying comprises comparing the received request to the accessed at least a subset of the at least one information set; and computer readable program code configured to provide, if at least one accessed information set fulfills the received request, a recommendation of an information set for purchase by the information purchaser, wherein the provided recommendation comprises at least one of the identified information sets that fulfills the received request.

An additional aspect of the invention provides a computer program product, comprising: a computer readable storage medium having computer readable program code embodied therewith, the computer readable program code executable by a processor and comprising: computer readable program code configured to receive, at a data service provider, a request from an information purchaser, wherein the request comprises (i) a budget identifying an amount of money to be spent on information and (ii) an objective function identifying a type of information that the information purchaser is requesting; computer readable program code configured to access at least a subset of at least one information set of at least one information seller, wherein each of the at least one information sets comprises an information set available for purchase from the information seller; computer readable program code configured to identify whether at least one accessed information set fulfills the received request, wherein the identifying comprises comparing the received request to the accessed at least a subset of the at least one information set; and computer readable program code configured to provide, if at least one accessed information set fulfills the received request, a recommendation of an information set for purchase by the information purchaser, wherein the provided recommendation comprises at least one of the identified information sets that fulfills the received request.

A further aspect of the invention provides a method, comprising: receiving, from a purchaser of information, a set of requirements corresponding to an information set desired by the purchaser, wherein the set of requirements comprise (i) a budget requirement identifying a monetary amount available for use in purchasing information and (ii) an information type requirement identifying a type of information the purchaser desires; comparing, using an advisor of a data service provider, the set of requirements to a plurality of purchasable information sets available for purchase from at least one seller, wherein the comparing comprises comparing the requirements to an accessible samples corresponding to each of the plurality of information sets; comparing, using the advisor, the set of requirements to a plurality of open information sets that do not require purchase available to the data service provider; and providing, to the purchaser, a recommendation of at least one information set to be obtained by the purchaser, wherein the recommendation comprises at least one of (i) the purchasable information sets and (ii) the open information sets that matches the set of requirements.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, all of the process steps, components and outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

The use of a third-party, for example, a service provider, a cloud service provider, or the like, for storing or managing information or data is helpful to data owners. The data owner can transfer the desired information to the third-party service provider and not have to purchase hardware or software that would be required to store and manage the information. Since the third-party is generally accessible over the Internet or other network accessible location, the data owner or other users allowed by the data owner can access the stored information from any location that can connect to the Internet or other network. Thus, the use of a third-party for storing information that a data owner has designated as available for purchase allows not only the data owner to access the information, but also allows any potential purchaser to see information regarding the information and ultimately access the information if the purchaser purchases the information. These third-parties that facilitate the transfer of data or information between sellers and purchases are frequently known as online information marketplaces.

In an online information marketplace, for example, an online information marketplace over a cloud service provider, various information sets may be available for purchase from one or more sellers. In this scenario sellers usually encrypt the information set that is available for purchase using a predefined encryption scheme and secret key. The encrypted information set is then uploaded or otherwise provided to the cloud service provider or secure cloud marketplace, without providing the secret key to the cloud service provider. The sellers also upload some metadata about the information set to the cloud service provider. The purchaser can then access the cloud marketplace to find a desired information set. The purchaser can use the metadata about the information set to assist in making a decision regarding whether an information set may fulfill the purchaser's requirements. When the purchaser finds a possible information set, the purchaser interfaces or engages with the seller to determine if the information set is actually the set that the purchaser wants to purchase, for example, by requesting the seller to perform an evaluation function. Thus, a purchaser looking for a particular information set may access the online information marketplace to locate a desired type of information. Traditionally, when the purchaser pays for the information set, the purchaser receives the whole plain text information set to use as the purchaser desires. However, there are disadvantages to this system from both the purchaser's and seller's perspective.

From the seller's perspective, once the information set is purchased by a purchaser and the seller provides the information set to the purchaser, the seller loses control of the information. Thus, the seller cannot be assured that the purchaser will not resell the information or mishandle the information, for example, if the information includes sensitive or secure information, the seller cannot be assured that the information will be treated with the necessary security. Additionally, ideally the seller would prefer to only share the information that is relevant to the purchaser. In other words, if the purchaser only needs a subset of the information, the seller would prefer to provide only this subset to the purchaser rather than the entirety of the information set. However, using traditional techniques, the seller does not know enough information about what the purchaser needs to only provide the relevant information to the purchaser.

From the purchaser's perspective, the purchaser is unable to determine what information the purchaser will ultimately receive. In other words, it is hard for a purchaser to determine that the information that the purchaser is buying is actually the desired information or information that will achieve the desired purpose. Thus, the purchaser does not know the actual value of the purchased information to the purchaser until the information is bought.

The conventional technique for assisting in mitigating the possibility that the purchaser may purchase information that is unusable for the purchaser's intended purpose is engagement between the seller and the purchaser. The purchaser engages with the seller to indicate a possible desire to purchase information for sale by the seller. The seller encrypts the information using a predefined encryption scheme and generates a secret key and then uploads the information to the online marketplace. The buyer and seller then agree upon an evaluation function that will be evaluated using the information for sale. The seller then provides the secret key to the purchaser and provides the evaluation function to the online marketplace. The purchaser and the online marketplace engage in a two party computation using the secret key, and the purchaser receives the output of the evaluation function. The purchaser can then determine whether the output indicates that the information would fulfil the requirements of the purchaser.

However, this technique has problems. First, the purchaser is unable to determine which seller or information set will provide the best value. For example, many different information sets may work for the purchaser's intended purpose, but some may provide higher quality information or some may provide the required information for a lower cost. Additionally, the purchaser would have to engage with each seller individually which may be very time consuming to the purchaser. Additionally, the purchaser does not know what quality of information that the purchaser would receive until after the information is purchased. Additionally, the purchaser may require information that meets particular compliance standards and will be unable to determine if the information will meet that compliance standard until after the information is purchased. Finally, the encryption scheme that is used by the seller and purchaser for encrypting the information is fixed by the online marketplace which may be burdensome on the seller and purchaser.

Accordingly, the techniques and systems as described herein provide a system and technique for using an advisor to provide a recommendation of one or more information sets to be purchased or accessed by a purchaser based upon requirements of the purchaser and analysis of those requirements to information sets that are available for purchase or access by the purchaser. The system may include an advisor or security advisor of, or associated with, a data service provider, for example, a cloud service provider, an online information marketplace, or the like. The advisor may receive a request from an information purchaser that indicates the type of information that the purchaser is interested in purchasing, or otherwise accessing, and a budget of the purchaser for obtaining the desired information.

The advisor can then access information provided to the data service provider from one or more sellers. For example, the sellers may provide a sample of an information set, an entire information set, or the like, to the data service provider. The advisor can access this information while still maintaining the security of the information with respect to any potential purchasers. In other words, the information provided by the seller is not accessible to a potential purchaser. The advisor may compare the received request provided by the purchaser to the information sets to determine if any of the information sets would fulfill the requirements of the purchaser. Upon identifying one or more information sets, the advisor may provide a recommendation to the purchaser regarding which information set should be accessed or purchased by the purchaser in order to fulfill the desired requirements, provide the best value to the purchaser, ensure any required compliance standard, and identify the quality of information that the purchaser will receive.

Such a system provides a technical improvement over current systems for online information marketplace transactions. The described systems and methods provide a technique that incorporates an advisor into the transaction between the purchaser and seller. Rather than the purchaser having to engage any or every possible seller to determine if the information available for purchase will fulfill the desired purpose of the purchaser, the purchaser can provide a request or requirement information regarding the desired information set to the advisor. The advisor can then compare the request or requirements to information accessible by the advisor from one or more sellers to determine if any of the potential sellers have information sets for sale that would fulfill the needs of the purchaser. The advisor can provide recommendations to the purchaser regarding recommended information sets for the purchaser to purchase. Thus, the system provides a technique that reduces the possibility that the purchaser may purchase information that does not fulfill the desired purpose of the purchaser. Additionally, the provided recommendation indicates an information set that will provide the best value to the purchaser and identifies the quality of the information, which is not possible using conventional techniques. Additionally, the seller does not have to provide all of the information set to the purchaser, and instead can provide only the portion that is relevant to the purchaser, thereby minimizing the exposure of the entire information set to possible mishandling. Finally, the described system provides a system in which the seller/purchaser can use any encryption scheme for encrypting information, rather than an encryption scheme dictated by the service provider.

Figure 1:
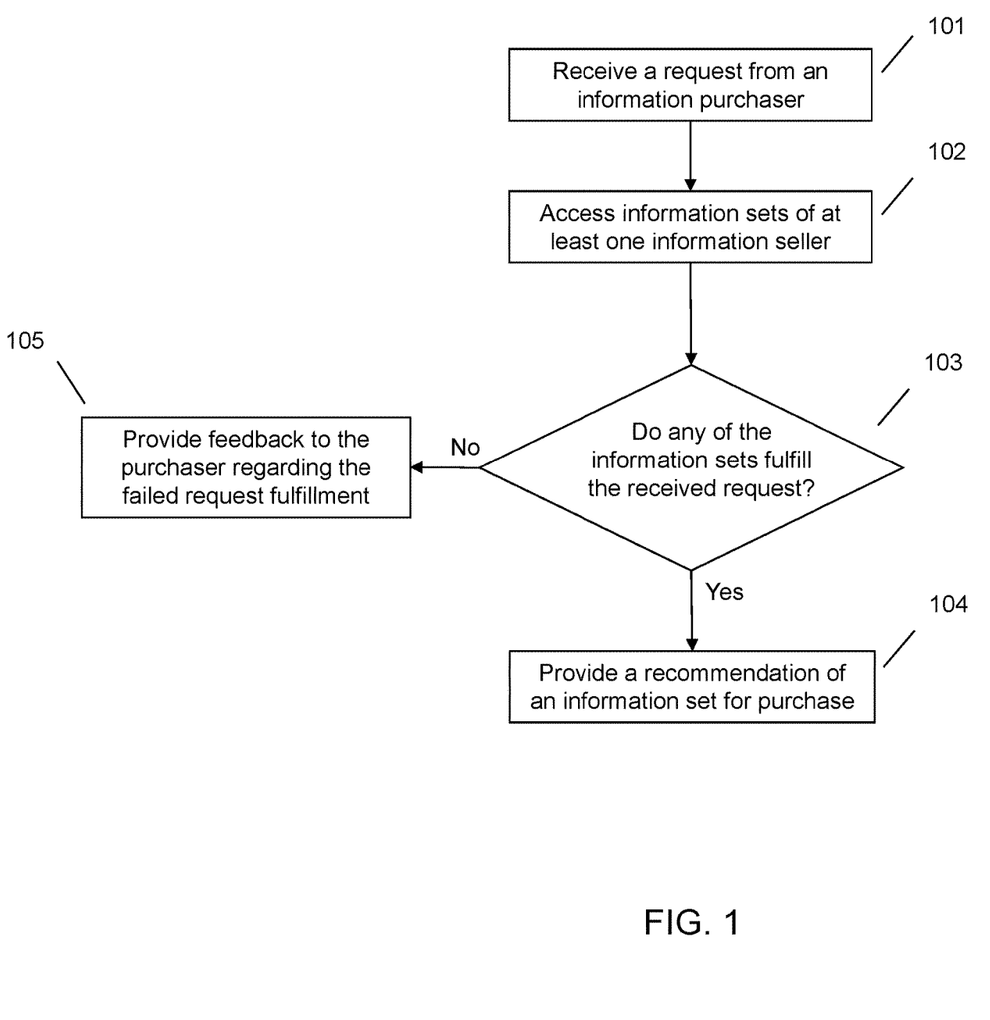
FIG. 1 illustrates a method of recommending an information set for purchase by an information purchaser using an advisor.

FIG. 1 illustrates a method for using an advisor to provide a recommendation of one or more information sets to be purchased or accessed by a purchaser based upon requirements of the purchaser and an analysis of those requirements to information sets that are available for purchase or access by the purchaser. At 101 the system may receive a request from an information purchaser. The request may be received at a data service provider, for example, an online information marketplace, a data storage provider, a secure cloud marketplace, or the like. The data service provider may include one or more advisors or security advisors that can receive requests from an information purchaser and perform the steps as described in more detail herein. The data service provider may also include components that may be used in conjunction with the advisor to parse and analyze requests. For example, the data service provider may include a parsing engine that can parse the request to determine requirements of the purchaser.

The request received at 101 may be provided by a user who is interested in purchasing or accessing one or more information sets accessible by the data service provider. For example, a purchaser may be interested in purchasing advertising information. Therefore, the purchaser has accessed the data service provider to find one or more sellers who have one or more information sets available for purchase related to advertising. Additionally or alternatively, the purchaser may be interested in open information sets, which may include one or more information sets that do not require purchase, but, rather, are free to a purchaser, for example, a public information set or an information set that is proprietary to the data service provider.

Thus, the request may include one or more requirements or targets of the purchaser. One included requirement may include a budget requirement that identifies an amount of money that the purchaser is willing to spend in order to obtain the desired information. Another included requirement may be an objective function that identifies a type of information that the purchaser is requesting. In other words, the objective function may identify the desired output that the purchaser is interested in. For example, the objective function may indicate that the purchaser is interested in more information regarding user shopping histories in order to provide targeted advertising, information having certain statistics for training a machine learning model, or the like. The objective function may be explicitly provided by the purchaser, may be identified from other information that the purchaser has provided, or identified using a helper tool that can take information explicitly provided by the purchaser and other information to create an objective function. For example, based upon a shopping history of the purchaser, the system may identify the types of information that the purchaser has previously searched for and may use this information to determine the objective function. As another example, if a purchaser provides information regarding information that the purchaser already has, the system may determine which information is missing or would be most useful and use this information to determine the objective function.

The request may also include other information or requirements. As an example, the purchaser may provide a database schema that identifies the type of information that the purchaser already has. The database schema may also include metadata associated with the information that the purchaser already has, for example, how many distinct values are included in the information, a date of last access or update of the information, how many columns are included in the information, and the like. The database schema may be generated by the purchaser or may be generated using a schema extractor tool.

The schema extractor tool may be an application that is accessible to the purchaser from a client device. Alternatively, the schema extractor tool may be stored at the data service provider or at a location accessible by the data service provider. The purchaser can upload information belonging to the purchaser to the data service provider and the data service provider may then use the schema extractor tool to generate the database schema. The schema extractor tool may provide more accurate functions than if the purchaser self generates the database schema. For example, the schema extractor tool can locate equivalent information labels (e.g., phone number and calling number, address and mail identifier, etc.), which may be particularly helpful when comparing the request of the purchaser to available information sets.

The purchaser may also provide a database sample which may include a sample of the information belonging to the purchaser. The database sample may be used by the advisor to estimate a type of match between the request of the purchaser and possible information sets. For example, the database sample may be used to estimate the number of matching records between the purchaser's information and an information set of an information seller. Like the database schema, the database sample may be generated by the purchaser or may be automatically generated using a sample extractor tool. The sample extractor tool, like the schema extractor tool, may be stored or accessible by the purchaser's local device or may be stored at or otherwise accessible by the data service provider. The purchaser may upload the information of the purchaser to a location where the sample extractor tool can be used to generate the database sample.

The purchaser may encrypt or anonymize the sample or schema before uploading the same to the data service provider. However, encrypting or anonymizing the sample or schema may affect the precision of recommendations provided by the advisor since the advisor may be unable to access all the information of the sample or schema. The purchaser may also provide information related to different parameters of the database, database sample, or database schema. For example, the purchaser may indicate the sensitivity or security requirements for portions of the information. For example, the purchaser may indicate that a particular column should be treated as confidential, unsecure, top secret, or the like. These sensitivity or security requirements may then be used by the advisor to determine which information could be provided to other possible purchasers, sellers, or be used for comparison or matching.

At 102 the advisor or data service provider may access at least a subset of one or more information sets that are either open or purchasable. An open information set may include an information set that is public to at least the data service provider. One example open information set may include a public database that is accessible and open to the public free of charge. Another example open information set may include a proprietary database that is proprietary to the data service provider, thereby being accessible and free of charge to the data service provider and users of the data service provider. A purchasable information set may include an information set that is available for purchase from an information seller. The information seller may be a user who is willing to let other users use the information in exchange for monetary compensation. The information seller likely only wants to provide information that is relevant to the purchaser rather than providing the entire information set.

The open information set may be located in a data storage location accessible to the data service provider. In the case of the proprietary information set, the data service provider may generate and maintain one or more information sets that are accessible to the data service provider and not accessible to other data service providers. The purchasable information set may be uploaded to the data service provider by the seller or may be accessible by the data service provider. For example, the information seller may store the information set at a data storage location and provide a link or pointer to the information set to the data service provider. Each of the information sets, whether open or purchasable, may include information that may be of interest to the purchaser based upon the requirements or request of the purchaser.

Accordingly, the advisor may access at least a subset of the information set to determine if one or more portions of the information set may be relevant to the information purchaser. The subset of the information set may include whatever information the information seller has chosen to make accessible to the data service provider. In other words, different sellers may be willing to share different amounts of information regarding an information set with the data service provider. Thus, the advisor is only able to access this shared information. In one example the information seller may upload the entirety of the information set to the data service provider. The advisor can then access the entire information set. However, in order to reduce the amount of processing time required by the advisor to identify matches, the system may generate a database schema and/or database sample, for example, using one or more techniques as discussed in connection with the database schema and database sample of the purchaser. Alternatively, the information seller may only provide a database schema and/or database sample to the data service provider.

The amount of information that the seller chooses to provide to the data service provider may be partially dependent on the level of trust that the seller has regarding the data service provider. Alternatively, the amount of information may be dependent on how sensitive the information may be. Additionally, the information seller may take additional or alternative precautions to ensure the security of the information. For example, the information seller may encrypt the information that is uploaded to the data service provider. Unlike conventional techniques, using the system as described herein, the seller can choose the encryption scheme for encrypting the information as opposed to having to use an encryption scheme identified by the data service provider. As another example, the information seller may set restrictions regarding when the information set can be accessed by the data service provider (e.g., only when the information seller is online, only when the advisor is processing a request from a trusted purchaser, only when the advisor is processing a request from a previously identified purchaser, etc.). The seller may also provide additional information with respect to the information sets, for example, the requested monetary amount required for purchasing the information set or a portion of the information set, the level of compliance of the information set, the sensitivity of the information set, and the like.

It should be understood that not all information sellers have to provide the same level of access to information set or the same amount of information to the data service provider. For example, one data seller may provide an entire information set, while another seller on the same online marketplace may provide only a database sample. Additionally, it should be understood that a single seller may provide different levels of access or amount of information regarding different information sets available for purchase from the data seller. For example, a data seller may have two information sets that are available for purchase with each of the two information sets having different amounts of information accessible by the data service provider.

At 103 the system may determine whether at least one accessed information set fulfills the received request or requirements of the purchaser. To make this determination the advisor may compare the received request and the requirements of the received request to the accessed information sets or subset of the accessed information sets, the purchasable information sets and/or the open information sets. The data service provider or advisor may employ one or more components to make this determination. For example, the data service provider may include a parsing engine that can be used to parse the request, parse the information within one or more information sets (either the seller or purchaser information set), or the like. The parsing engine may be useful to transform the information into a format that can be analyzed by the advisor or into a format matching a format of another information set. For example, the information provided by the purchaser and the information sets may be provided in different formats (e.g., structure, unstructured, text, etc.) and the parsing engine may be employed to convert the information into a particular format.

The advisor or data service provider may also employ an analytics engine to analyze the information within the request and information set to determine one or more matches between the request and the information sets. For example, the advisor may use an analytics engine to determine how many records match between the information of the purchaser and the one or more information sets. The analytics engine may also be used to determine the quality of the information set, specifically with respect to the purchaser. For example, different purchasers may consider the same information set to have a different quality due to the fact that the information set would be used for different purposes. Thus, the advisor accounts for the provided objective function of the purchaser and uses the analytics engine to determine the quality of the information set and the quality that would be provided to the information set of the purchaser.

The advisor or data service provider may also access an encryption engine and/or key store depending on the information that is accessed. For example, if either the information provided by the purchaser or the information set is encrypted, the system may access a key store that includes the encryption keys necessary for decrypting the information to be readable or accessible by the advisor or data service provider. The system may then employ an encryption engine to decrypt the information using the encryption key corresponding to the encrypted information. The advisor or data service provider may also use other components for analyzing the request against the information sets.

The encryption engine and/or key store may also be used for other functions. For example, the advisor or data service provider may have access to an open information set (e.g., public information set, proprietary information set, etc.) that is provided as plaintext. Additionally, the seller may provide at least a portion of one or more information sets as plaintext. If a purchaser wants to run an evaluation function, for example, finding the intersection size, between the information of the purchaser and the information accessible to the data service provider, the purchaser and data service provider may engage in a two party secure multi-party computation protocol. After performing the protocol, the data service provider and the purchaser will know the result of the evaluation, for example, the intersection set size, but nothing else. In order to prevent communication of anything else, the data service provider may use the encryption engine and the key store to engage in the protocol with the purchaser.

Determining that an information set fulfills the received request may include determining that the amount of money necessary for purchasing the one or more information sets is at or below the budget requirement of the purchaser. Additionally, determining that an information set fulfills the received request may include determining that the quality of the information and/or the number of matches reaches or exceeds a predetermined threshold. The predetermined threshold may include a default threshold set by the advisor or data service provider or may be a threshold that is set by the purchaser and/or the information seller. For example, the purchaser may only be interested in information sets that have a predetermined number of probable record matches. As another example, the information seller may set a security setting that requires that a specific quality threshold is met before the seller is willing to sell the information set to a purchaser.

If the system determines that one or more information sets, purchasable information sets and/or open information sets, or portions of one or more information sets do not fulfill the received request at 103, the system may provide feedback to the purchaser that the request cannot be fulfilled at 105. The system may also provide feedback regarding changes that the purchaser could make to the request that would result in one or more information sets meeting the revised request. Some of these proposed changes are discussed in more detail below.

If, however, the system determines that one or more information sets or portions of one or more information sets fulfill the received request at 103, the system may provide a recommendation of an information set to be purchased by the information purchaser at 104. The recommendation may provide an identification of the information sets that would fulfill the requirements and which information sellers to purchase the information sets from. The recommendation may also provide the purchaser with an amount of money that will be required to purchase any or all of the recommended information sets. The purchaser can then use this information, along with additional information included in the recommendation, to determine the value that the purchaser will receive for the amount of money that will be necessary.

The recommendation may also provide an indication of what information, in addition to the information that the purchaser already has, the purchaser will obtain by combining the recommended information set with the information of the purchaser. The recommendation may also include an expected number of records that will match between the various information sets and the purchaser's information. The indication of what additional information is provided and an expected number of matches may provide an indication to the purchaser of the quality of information that will be received and also provides the purchaser with an idea of what the purchaser's information will be when combined with the recommended information set. The recommendation may also identify what type of encryption schemes will be needed to match or join the recommended information set with the purchaser's own information. The recommendation may also provide additional details, for example, if any irregularities are found within the request by the purchaser (e.g., conflicting requests in the objective function or requirements that cannot be resolved, etc.), if the information meets compliance requirements, and the like.

The recommendation may also include suggestions for modifying the request that may result in more information set matches or recommendations or that may result in more focused information set matches or recommendations. For example, the recommendation may include a suggestion for modifying the requirement amount that would result in an information set recommendation that would provide more quality information to the purchaser as opposed to the quality of the information in the currently recommended information sets. As another example, the recommendation may include a suggestion for modifying the objective function that may result in a recommended information set that would provide information having a higher or lower security setting. In response to the recommendation, the purchaser may provide feedback or modifications to the request and provide these modifications to the advisor. The advisor may then rerun the previous steps (e.g., 102, 103, and 104/105) to provide new or updated recommendations. Thus, the system allows an iterative technique that allows the purchaser multiple recommendation/feedback rounds between the advisor and the purchaser.

Figure 2:
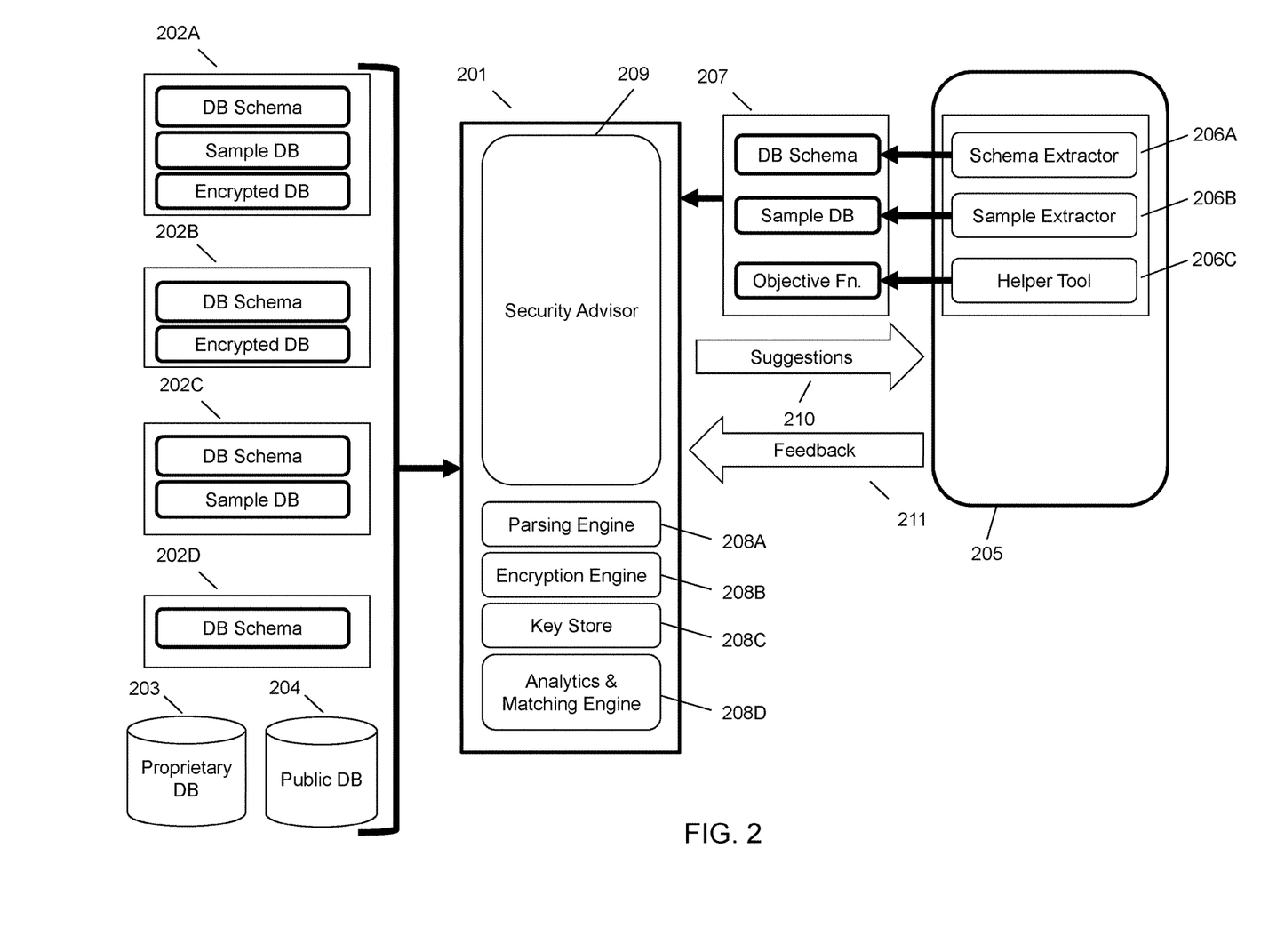
FIG. 2 illustrates an example system for recommending an information set for purchase by an information purchaser using an advisor.

FIG. 2 illustrates an overall communication system between the different components of the described system. The data service provider 201 includes an associated security advisor 209. The security advisor 209 receives a request from a purchaser 205 which may include different requirements or components 207, for example, a database schema, sample database, and/or objective function. The received requirements or components may be generated by the purchaser 205 or may be generated using one or more tools, for example, a schema extractor 206A, sample extractor 206B, and/or helper tool 206C. The security advisor 209 then compares the received requirements or components 207 to information sets 202A-202D, 203, and/or 204. The information sets may include purchasable information sets provided by information sellers 202A-202D or may include open information sets, for example, a public database 203 or proprietary database 204.

In comparing or matching the received requirements or components 207 to the information sets 202A-202D, 203, and/or 204, the security advisor 209 may employ one or more components 208A-208D. For example, the security advisor 209 may employ a parsing engine 208A to parse the request 207 and the information sets 202A—202D, 203, and/or 204. The security advisor 209 may also employ an encryption engine 208B and key store 208C to decrypt any encrypted information. The security advisor 209 may also employ an analytics and matching engine 208D to actually compare the request 207 to the information sets 202A-202D, 203, and/or 204 and determine if any of the information sets 202A-202D, 203, and/or 204 or portions of the information sets 202A-202D, 203, and/or 204 may fulfill the request 207. The security advisor 209 then provides a recommendation to the purchaser 205 regarding an information set that will fulfill the request 207. The security advisor 209 may also provide suggestions 210 to modify the request 207 that may result in more matches or better quality matches. The purchaser 205 may provide feedback 211 responsive to the recommendation and/or feedback 210 provided by the security advisor 209.

Thus, the described systems and methods provide a technique for matching a purchaser of information and seller of information that results in a transaction that is beneficial to the purchaser in that the purchaser can be assured that the purchased information set will meet the desired requirements and result in an information set that fulfill the purchasers desired intent. The transaction is also beneficial to the seller in that it ensures that only information that is relevant to the purchaser is delivered to the purchaser, thereby minimizing the exposure of the entire information set of the seller to mishandling.

Figure 3:
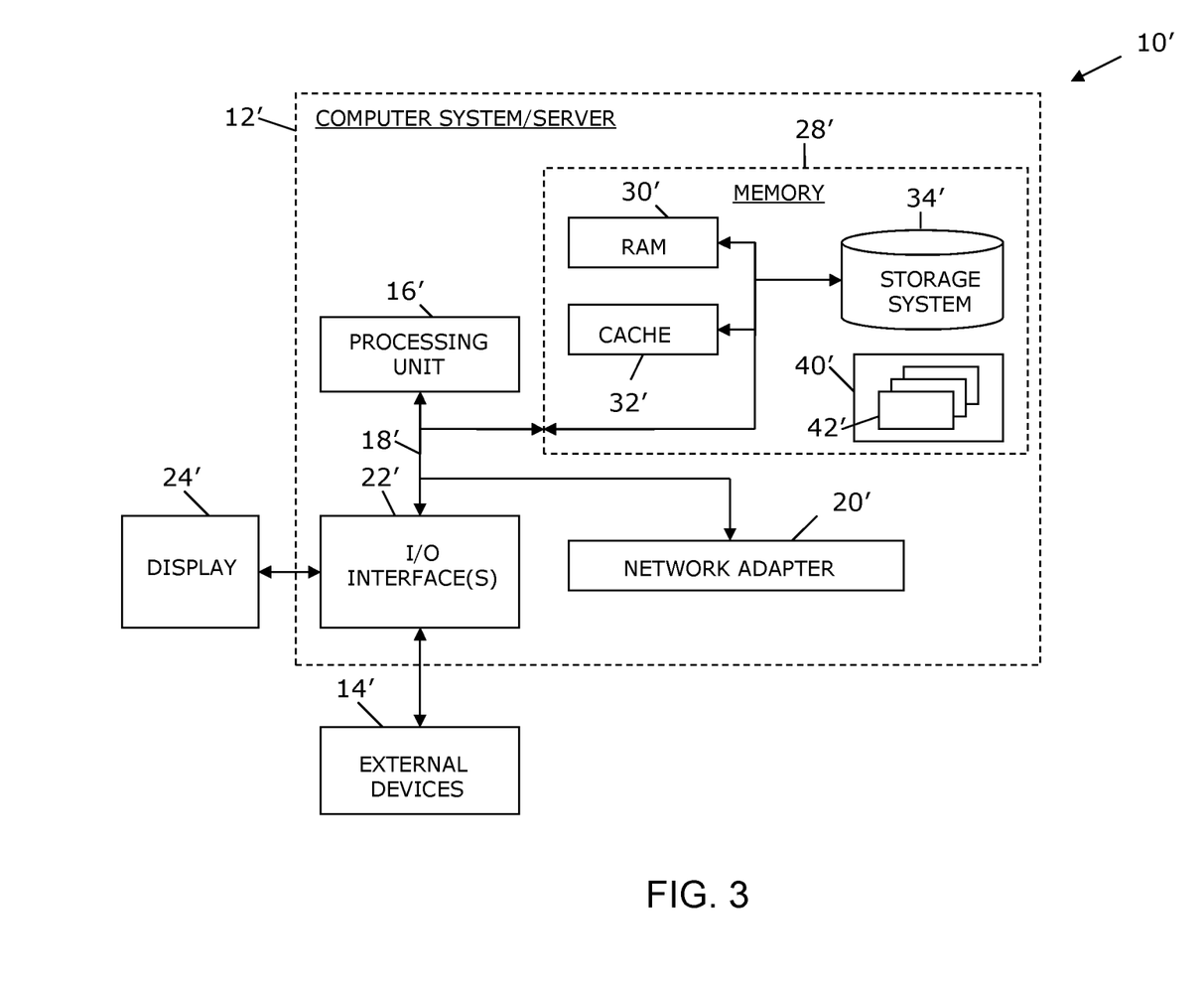
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
   receiving, at a data service provider comprising a cloud marketplace and a security advisor, a request from an information purchaser, wherein the request comprises (i) a budget identifying an amount of money to be spent on information included by at least one information seller on the cloud marketplace and (ii) an objective function identifying a type of information that the information purchaser is requesting, wherein the security advisor acts as an intermediary between information sellers on the cloud marketplace and information purchasers to facilitate information set purchases and reduce disclosure of information of the information sellers to information purchasers;
   accessing, by the security advisor, at least a subset of at least one information set available for purchase from the at least one information seller, wherein the at least a subset is made accessible to the security advisor by the at least one information seller;
   identifying, by the security advisor, at least one accessed information set that fulfills the received request, wherein the identifying comprises transforming the request and the at least a subset of the at least information set into a format analyzable by the security advisor and into matching formats by parsing, utilizing a parsing engine, the request and the at least a subset of the at least one information set, wherein the identifying comprises comparing the parsed request to the parsed at least a subset of the at least one information set, wherein the comparing comprises determining a number of matches between the parsed request and the parsed at least a subset of the at least one information set by analyzing, utilizing an analytics engine, the parsed request and the parsed at least a subset of the at least one information set, wherein the identifying comprises determining, using the analytics engine, a quality of the at least a subset of the at least one information set with respect to the information purchaser in view of the objective function; and
   providing, by the security advisor, a recommendation of an information set for purchase by the information purchaser, wherein the provided recommendation comprises at least one of the identified information sets that fulfills the received request.

2. The method of claim 1, wherein the request comprises at least one of: (i) a database schema identifying the type of information that the information purchaser already has and (ii) a database sample comprising a sample of the information the information purchaser already has.

3. The method of claim 2, wherein the objective function identifies the sensitivity of information included in the database schema and the database sample.

4. The method of claim 1, comprising accessing information from (i) a public database and (ii) a database of the data service provider.

5. The method of claim 4, wherein the comparing comprises comparing the received request to the accessed information from (i) the public database and (ii) the database of the data service provider to identify if one of: (i) the public database and (ii) the database of the data service provider fulfills the request.

6. The method of claim 1, wherein the at least one information set is encrypted by the information seller using an encryption scheme.

7. The method of claim 1, wherein the providing a recommendation comprises identifying a monetary requirement for purchasing the recommended information set.

8. The method of claim 1, wherein the providing a recommendation comprises suggesting modifications to the received request that would result in more information set matches.

9. The method of claim 1, comprising (i) receiving input from the information purchaser responsive to the provided recommendation and (ii) iteratively performing the identifying and providing a recommendation steps based upon the received input.

10. The method of claim 1, wherein the at least a subset comprises a sample of an information set available for purchase.

11. An apparatus, comprising:
at least one processor; and
a computer readable storage medium having computer readable program code embodied therewith and executable by the at least one processor, the computer readable program code comprising:
computer readable program code configured to receive, at a data service provider comprising a cloud marketplace and a security advisor, a request from an information purchaser, wherein the request comprises (i) a budget identifying an amount of money to be spent on information included by at least one information seller on the cloud marketplace and (ii) an objective function identifying a type of information that the information purchaser is requesting, wherein the security advisor acts as an intermediary between information sellers on the cloud marketplace and information purchasers to facilitate information set purchases and reduce disclosure of information of the information sellers to information purchasers;
computer readable program code configured to access, by the security advisor, at least a subset of at least one information set available for purchase from the at least one information seller, wherein the at least a subset is made accessible to the security advisor by the at least one information seller;
computer readable program code configured to identify, by the security advisor, at least one accessed information set that fulfills the received request, wherein the identifying comprises transforming the request and the at least a subset of the at least information set into a format analyzable by the security advisor and into matching formats by parsing, utilizing a parsing engine, the request and the at least a subset of the at least one information set, wherein the identifying comprises comparing the parsed request to the parsed at least a subset of the at least one information set, wherein the comparing comprises determining a number of matches between the parsed request and the parsed at least a subset of the at least one information set by analyzing, utilizing an analytics engine, the parsed request and the parsed at least a subset of the at least one information set, wherein the identifying comprises determining, using the analytics engine, a quality of the at least a subset of the at least one information set with respect to the information purchaser in view of the objective function; and
computer readable program code configured to provide, by the security advisor, a recommendation of an information set for purchase by the information purchaser, wherein the provided recommendation comprises at least one of the identified information sets that fulfills the received request.

12. A computer program product, comprising:
a non-transitory computer readable storage medium having computer readable program code embodied therewith, the computer readable program code executable by a processor and comprising:
computer readable program code configured to receive, at a data service provider comprising a cloud marketplace and a security advisor, a request from an information purchaser, wherein the request comprises (i) a budget identifying an amount of money to be spent on information included by at least one information seller on the cloud marketplace and (ii) an objective function identifying a type of information that the information purchaser is requesting, wherein the security advisor acts as an intermediary between information sellers on the cloud marketplace and information purchasers to facilitate information set purchases and reduce disclosure of information of the information sellers to information purchasers;
computer readable program code configured to access, by the security advisor, at least a subset of at least one information set available for purchase from the at least one information seller, wherein the at least a subset is made accessible to the security advisor by the at least one information seller;
computer readable program code configured to identify, by the security advisor, at least one accessed information set that fulfills the received request, wherein the identifying comprises transforming the request and the at least a subset of the at least information set into a format analyzable by the security advisor and into matching formats by parsing, utilizing a parsing engine, the request and the at least a subset of the at least one information set, wherein the identifying comprises comparing the parsed request to the parsed at least a subset of the at least one information set, wherein the comparing comprises determining a number of matches between the parsed request and the parsed at least a subset of the at least one information set by analyzing, utilizing an analytics engine, the parsed request and the parsed at least a subset of the at least one information set, wherein the identifying comprises determining, using the analytics engine, a quality of the at least a subset of the at least one information set with respect to the information purchaser in view of the objective function; and
computer readable program code configured to provide, by the security advisor, a recommendation of an information set for purchase by the information purchaser, wherein the provided recommendation comprises at least one of the identified information sets that fulfills the received request.

13. The computer program product of claim 12, wherein the request comprises at least one of: (i) a database schema identifying the type of information that the information purchaser already has and (ii) a database sample comprising a sample of the information the information purchaser already has.

14. The computer program product of claim 13, wherein the objective function identifies the sensitivity of information included in the database schema and the database sample.

15. The computer program product of claim 12, comprising accessing information from (i) a public database and (ii) a database of the data service provider and wherein the comparing comprises comparing the received request to the accessed information from (i) the public database and (ii) the database of the data service provider to identify if one of: (i) the public database and (ii) the database of the data service provider fulfills the request.

16. The computer program product of claim 12, wherein the at least one information set is encrypted by the information seller using an encryption scheme.

17. The computer program product of claim 12, wherein the providing a recommendation comprises identifying a monetary requirement for purchasing the recommended information set.

18. The computer program product of claim 12, wherein the providing a recommendation comprises suggesting modifications to the received request that would result in more information set matches.

19. The computer program product of claim 12, comprising (i) receiving input from the information purchaser responsive to the provided recommendation and (ii) iteratively performing the identifying and providing a recommendation steps based upon the received input.

20. A method, comprising:
receiving, from a purchaser of information and at an advisory of cloud marketplace, a set of requirements corresponding to an information set desired by the purchaser, wherein the set of requirements comprise (i) a budget requirement identifying a monetary amount available for use in purchasing information included by at least one seller on the cloud marketplace and (ii) an information type requirement identifying a type of information the purchaser desires, wherein the advisor acts as an intermediary between sellers on the cloud marketplace and purchasers to facilitate information set purchases and reduce disclosure of information of the sellers to purchasers;

comparing, using the advisor of the cloud marketplace, the set of requirements to a plurality of purchasable information sets available for purchase from the at least one seller, wherein the comparing comprises comparing the requirements to accessible samples corresponding to each of the plurality of information sets, wherein the comparing comprises transforming the set of requirements and the accessible samples into a format analyzable by the advisor and into matching formats by parsing, utilizing a parsing engine, the set of requirements and the accessible samples, determining a number of matches between the parsed set of requirements and the parsed accessible samples by analyzing, utilizing an analytics engine, the parsed set of requirements and the parsed accessible samples, and determining, using the analytics engine, a quality of the accessible samples with respect to the purchaser in view of the information type;

comparing, using the advisor, the set of requirements to a plurality of open information sets that do not require purchase available to the data service provider wherein the comparing comprises transforming the set of requirements and the plurality of open information sets into a format analyzable by the advisor and into matching formats by parsing, utilizing a parsing engine, the set of requirements and the plurality of open information sets, determining a number of matches between the parsed set of requirements and the parsed plurality of open information sets by analyzing, utilizing an analytics engine, the parsed set of requirements and the parsed plurality of open information sets, and determining, using the analytics engine, a quality of the plurality of open information sets with respect to the purchaser in view of the information type; and providing, to the purchaser, a recommendation of at least one information set to be obtained by the purchaser, wherein the recommendation comprises at least one of (i) the purchasable information sets and (ii) the open information sets that matches the set of requirements.

* * * * *